Aug. 20, 1957     E. M. LUNSFORD     2,803,155
QUARTER BAG STOW LOOP TOOL
Filed Aug. 5, 1955     3 Sheets-Sheet 1
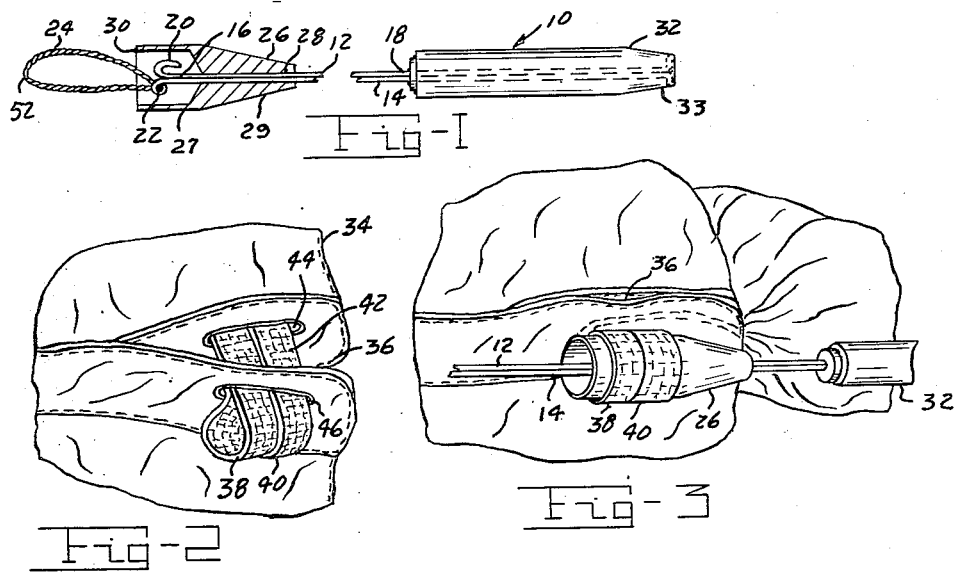
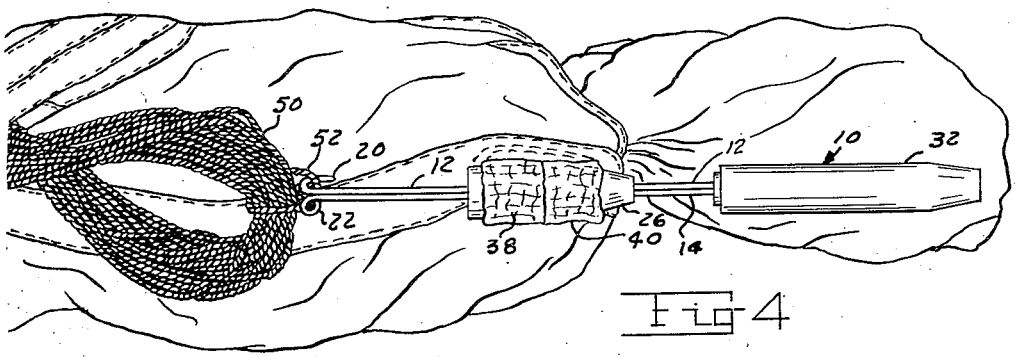
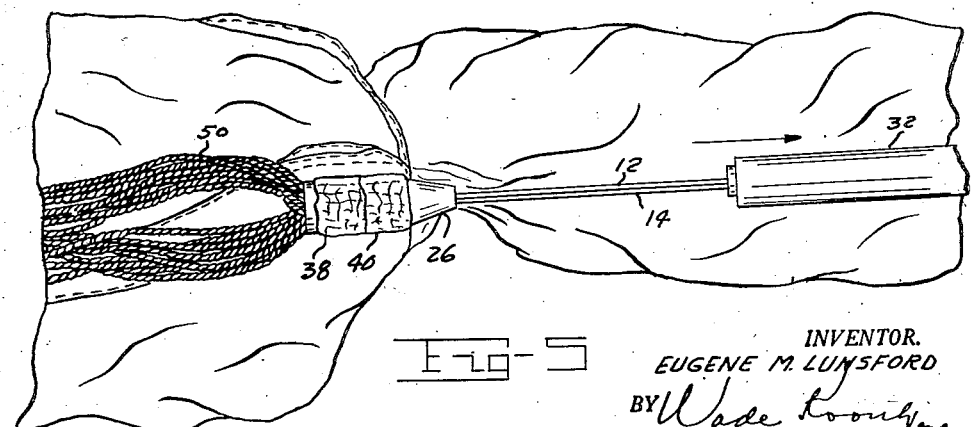
INVENTOR.
EUGENE M. LUNSFORD
BY
ATTORNEYS

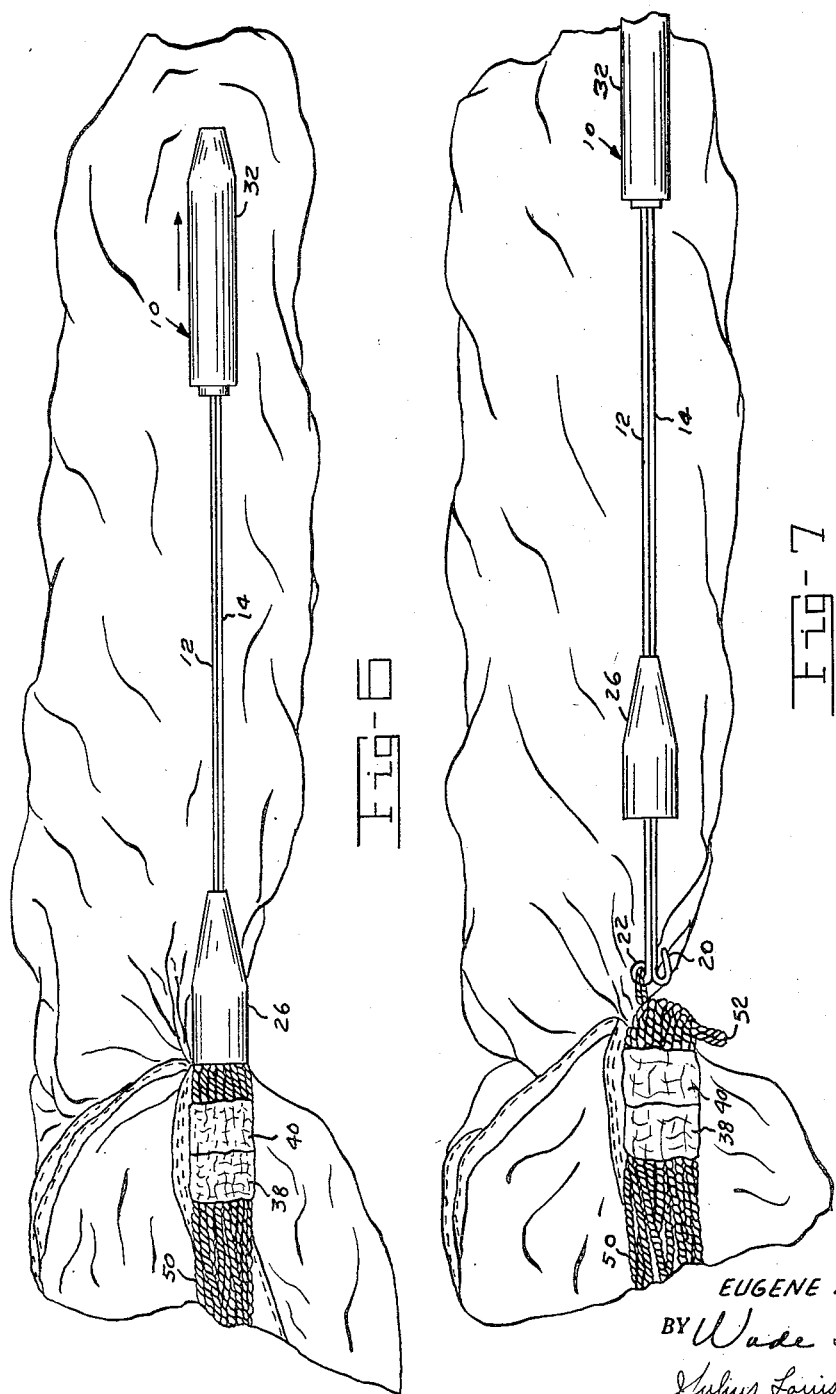

Aug. 20, 1957                  E. M. LUNSFORD                  2,803,155
                          QUARTER BAG STOW LOOP TOOL

Filed Aug. 5, 1955                                          3 Sheets-Sheet 3

INVENTOR.
EUGENE M. LUNSFORD
BY
ATTORNEYS

2,803,155

QUARTER BAG STOW LOOP TOOL

Eugene M. Lunsford, Fort Lauderdale, Fla., assignor to the United States of America as represented by the Secretary of the Air Force Application August 5, 1955, Serial No. 526,794

3 Claims. (Cl. 81—3)

(Granted under Title 35, U. S. Code (1952), sec. 266)

The invention described herein may be manufactured and used by or for the United States Government for governmental purposes without payment to me of any royalty thereon.

This invention relates to a tool and more particularly to a quarter bag stow loop tool adapted to be used for stowing a portion of a high speed parachute in a quarter bag.

Quarterbags are widely used in connection with modern high speed parachutes. In packing a portion of the parachute in a quarter bag, it is necessary to position the parachute suspension or shroud lines in a series of loops on the quarter bag. In addition, a locking loop is mounted in the quarter bag which embraces the parachute and retains the parachute in the quarter bag. The ends of this locking loop are looped and are made to receive the parachute shroud lines. Since the shroud or suspension lines must be properly positioned in many loops, packing a parachute in a quater bag is difficult and time consuming. It is, therefore, a principal object of this invention to provide a quarter bag stow loop tool which will expedite the proper insertion of the parachute suspension or shroud lines into the loops on the quarter bag and into the looped ends of the locking loop in the quarter bag.

A further object of this invention is to provide a tool adapted to shape a bundle of parachute suspension lines, loops on the quarter bag and the looped end portions of the locking loop so that the shaped bundle of suspension lines may be readily inserted into the shaped loops on the quarter bag and the shaped looped ends of the locking loop.

An additional object of this invention is to provide a quarter bag stow loop tool that is light weight, efficient and economical to manufacture.

This and other objects will become for apparent when read in the light of the accompanying drawings and specification wherein the scope of this invention is defined by reference to the appended claims wherein:

Fig. 1 is a side elevation of the quarter bag stow loop tool.

Fig. 2 discloses the looped end portions of the locking loop extending through slots in the side of the quarter bag.

Fig. 3 discloses a thimble on the quarter bag stow loop tool being used to shape the ends of the locking loop and receive the suspension lines.

Fig. 4 shows the quarter bag stow loop tool grasping or embracing the parachute shroud lines prior to the insertion of the shroud lines in the looped end portions of the locking loop.

Fig. 5 shows the counterbore at the front end of the thimble of the quarter bag stow loop tool being used to shape the parachute shroud lines into a cylindrical bundle so they may be readily inserted into the looped end portions of the locking loop.

Fig. 6 shows the position of the quarter bag stow loop tool after the parachute shroud lines have been inserted in the looped end portion of the locking loop.

Fig. 7 shows the position of the quarter bag stow loop tool after the parachute shroud lines have been inserted in the looped end portion of the locking loop just prior to removal of the tool.

Figure 8:
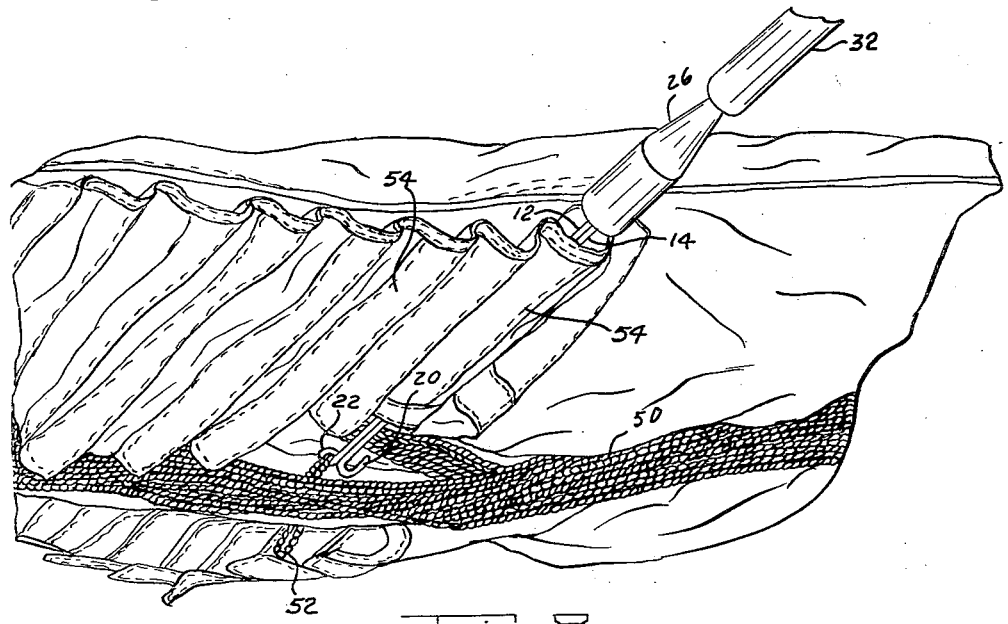
Fig. 8 shows the position of the quarter bag stow loop tool just prior to the insertion of the parachute shroud lines into the loops on the quarter bag.

Referring to the drawings by reference number, and more particularly to Fig. 1, the quarter bag stow loop tool, designated generally as 10, comprises two parallel rods 12 and 14 in side-by-side relationship. These rods are welded together at 16 and 18 so that their end portions are in abutment. The front end of rod 12 is shaped in the form of a narrow hook 20. The abutting end of rod 14 is shaped in the form of an eyelet 22. A cord loop 24 is secured to this eyelet. A thimble 26 having a front cylindrical portion 27 and a rear tapered portion 29, has an axial bore 28 therethrough. An enlarged counterbore 30 is disposed at the front cylindrical portion of the thimble. The thimble is mounted to slide freely on rods 12 and 14 which penetrates the axial bore and extends through the thimble. A handle 32 having a tapered end 33 is mounted on the rear ends of rods 12 and 14. The handle has a cylindrical cross-section that is of a less diameter than the diameter of the cylindrical portion of the thimble, the inside diameter of the looped ends of the locking loop, and the loops on the quarter bag.

The quarter bag 34, a portion of which is shown in Fig. 2, has a slit 36 along one side adapted to receive the portion of the parachute to be inserted in it. A parachute locking loop 42 is positioned in the bag to embrace the parachute and secure it to the quarter bag. The looped end portions 38 and 40 of the locking loop 42 penetrate slots 44 and 46 in the quarter bag.

As seen in Fig. 3, to insert the parachute shroud or suspension lines into the looped ends 38 and 40 of the locking loop, the thimble 26 is first inserted in these looped ends forcing them into a substantially cylindrical shape, see Fig. 3. This is accomplished by first inserting the tapered rear end 33 of handle 32 in these looped ends and then moving the handle entirely through them. Next the tapered rear end 29 of thimble 26 is inserted in the looped ends and then the thimble is forced through these looped ends until they tightly embrace the cylindrical portion 27 of the thimble. Then rods 12 and 14 are moved through the thimble until the front ends 20 and 22 are closely adjacent shroud lines 50, see Fig. 4. Next the cord loop 24 is wrapped around the parachute shroud lines and end 52 of the cord loop is secured to hook 20 to form a cord connection between the abutting front ends of the parallel rods. This cord connection embraces the shroud lines 50, so when rods 12 and 14 are moved in the direction of the arrow shown in Fig. 5, the shroud lines are also moved in the same direction. Since the thimble 26 is held stationary by the looped ends 38 and 40 of locking loop 42 rods 12 and 14 move through bore 28 of the thimble pulling shroud lines 50 into counterbore 30. This has the effect of shaping the parachute shroud lines into a compact, substantially cylindrical bundle so they can be readily inserted into the cylindrical shaped looped ends 38 and 40 of the locking loop. When increased pressure is put on the tool in the same direction as shown in Fig. 6, the thimble is pulled out of the looped ends of locking loop and the parachute shroud lines secured to the rods by the cord and hook arrangement, as shown in Fig. 4, are pulled into the looped end portions of the locking loop. To withdraw the tool from its connection to the parachute shroud lines, end 52 of cord loop 54 is disengaged from hook 20, see Fig. 7.

Figure 9:
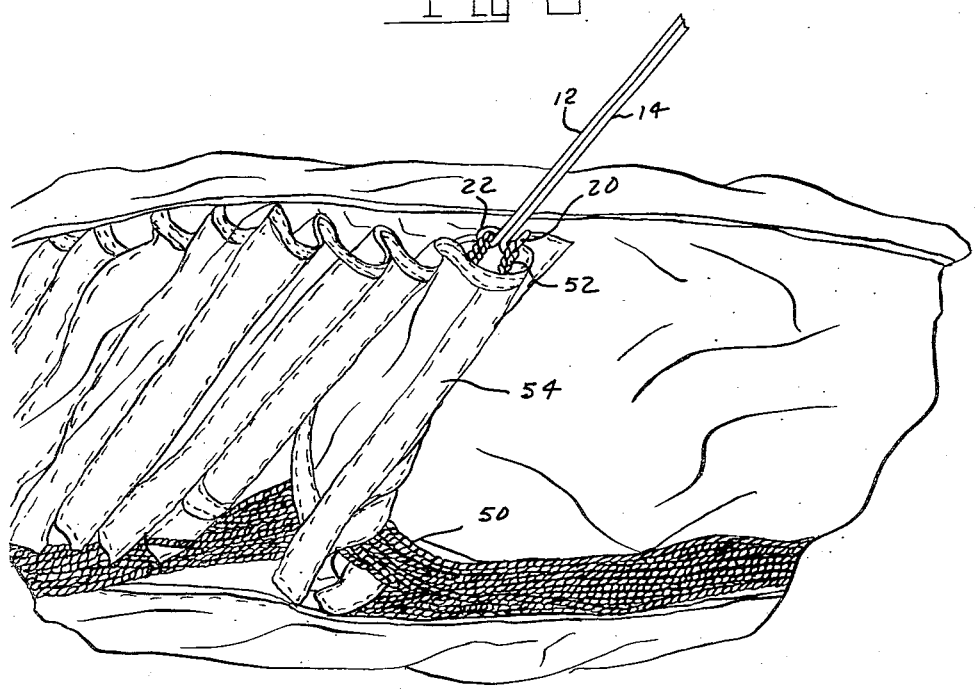
Fig. 9 shows the position of the quarter bag stow loop tool just after the parachute shroud lines have been inserted in one of the loops on the quarter bag.

To insert the parachute shroud lines 50 in loops 54 on the quarter bag the tool is first inserted in one of the loops, see Fig. 8. Then as above, the cord loop 24 is wrapped around the shroud lines and is fastened to loop 20 to form a cord connection between the abutting front ends of parallel rods 12 and 14. Next the tool is withdrawn from the loop 54 pulling the parachute shroud lines into the loop, see Fig. 9. The tool is then disconnected from the shroud lines by releasing end 52 of the cord loop 24 from the hook 20. In this operation the thimble of the tool is not necessarily used to shape the loops of the shroud lines. This is because the loops on the quarter bag are usually sufficiently large relative to the thickness of the bundle of shroud lines. It will be appreciated, however, that if the situation demands that a loop on the quarter bag and the bundle of shroud lines be shaped in order for the bundle of shroud lines to fit in the loop, the thimble can be inserted in the loops, and used in the same way it was used to insert the bundle of shroud lines into the looped ends of the locking loop.

Having thus described the invention, what is claimed as new to be secured by Letters Patent is,

1. A quarter bag stow loop tool for a parachute, comprising rod means and a cord, said cord secured to one end of said rod means, means on said end of the rod means adapted to be removably secured to a portion of the cord to form a cord loop on the end of the rod means, said cord loop adapted to embrace the shroud lines of a parachute, shaping means movably mounted on said rod means for shaping the looped ends of a parachute locking loop, the loops on the quarter bag and the parachute shroud lines to enable the parachute shroud lines to be easily inserted in the looped ends of the locking loop and the loops on the quarter bag.

2. A tool for passing a loop of individual cords into a retaining loop to be frictionally retained therein comprising a handle having a diameter smaller than the outside diameter of the retaining loop, a rod extension secured to the handle, means on the end of the rod extension for removably securing a pulling cord loop thereto and a thimble slidably mounted on said rod extension, said thimble having a diameter such as to expand the fabric retaining loop when passed therethrough and having a tapered portion, said thimble having an internal counterbore serving as a receptacle for the loop of cords when the latter are pulled therein.

3. A quarter bag stow loop tool for a parachute comprising a handle having an elongated shank projecting therefrom, said elongated shank terminating in an eyelet and an adjacent hook, a cord secured to the eyelet, said hook adapted to be removably secured to a portion of the cord to form a cord loop on the end of the elongated shank, said cord loop adapted to embrace the shroud lines of a parachute, a thimble having a front cylindrical portion and a rear tapered portion movably mounted on said elongated shank to shape the looped ends of a parachute locking loop, the loop on a quarter bag, and the parachute shroud lines to enable the parachute shroud lines to be easily inserted in the looped ends of the locking loop, said thimble having an axial bore therethrough, said elongated shank penetrating said bore to permit the thimble to slide freely on the shank, an enlarged cylindrical counterbore at the front end of the thimble adapted to receive and shape said shroud lines, said handle having a cross-section such that the greatest straight line distance between any points on the periphery of the cross-section is less than the diameter of the cylindrical portion of the thimble.

References Cited in the file of this patent
UNITED STATES PATENTS

| | | |
|---|---|---|
| 1,489,738 | Canning | Apr. 8, 1924 |
| 2,543,064 | Roll | Feb. 27, 1951 |